United States Patent
Tsai et al.

(10) Patent No.: US 9,763,113 B2
(45) Date of Patent: Sep. 12, 2017

(54) WIRELESS RECEIVING SYSTEM AND ASSOCIATED SIGNAL PROCESSING METHOD

(71) Applicant: MStar Semiconductor, Inc., Hsinchu Hsien (TW)

(72) Inventors: Teng-Han Tsai, Zhubei (TW); Xiao-Peng Chen, Zhubei (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 39 days.

(21) Appl. No.: 14/220,214

(22) Filed: Mar. 20, 2014

(65) Prior Publication Data

US 2014/0293808 A1    Oct. 2, 2014

(30) Foreign Application Priority Data

Mar. 29, 2013 (TW) .............. 102111498 A

(51) Int. Cl.
*H04W 24/02* (2009.01)
*H04L 29/06* (2006.01)
*H04W 52/02* (2009.01)

(52) U.S. Cl.
CPC ......... *H04W 24/02* (2013.01); *H04L 69/12* (2013.01); *H04L 69/22* (2013.01); *H04W 52/0216* (2013.01); *H04W 52/0232* (2013.01); *Y02B 60/50* (2013.01)

(58) Field of Classification Search
None
See application file for complete search history.

(56) References Cited

U.S. PATENT DOCUMENTS

| 8,116,408 B2 | 2/2012 | Gaikwad |
| 2004/0100956 A1 | 5/2004 | Watanabe |
| 2009/0016376 A1* | 1/2009 | Sawai ............... H04W 52/0232 370/465 |
| 2009/0125302 A1* | 5/2009 | Kumar ................ G10L 19/005 704/222 |
| 2011/0116534 A1 | 5/2011 | Seibert et al. |
| 2011/0194555 A1* | 8/2011 | Shen .................... H04L 1/0072 370/389 |

(Continued)

FOREIGN PATENT DOCUMENTS

| CN | 1989724 A | 6/2007 |
| CN | 101132189 A | 2/2008 |
| CN | 102238697 A | 11/2011 |

OTHER PUBLICATIONS

Taiwan Office Action dated Nov. 13, 2014, 6 pages.
TIPO Office Action, Sep. 22, 2015, 6 pages.
SIPO Office Action, Dec. 6, 2016, 5 pages.

*Primary Examiner* — Yaotang Wang
(74) *Attorney, Agent, or Firm* — Edell, Shapiro & Finnan, LLC

(57) ABSTRACT

A wireless receiving system includes a packet searching module and a memory module. The packet searching module performs packet searching that includes adopting at least one parameter. The memory module stores the at least one parameter corresponding to a packet as a set of reference parameters. At a predetermined time point, the packet searching module again performs packet searching according to the set of reference parameters stored in the memory module.

16 Claims, 3 Drawing Sheets

(56) References Cited

U.S. PATENT DOCUMENTS

| | | | |
|---|---|---|---|
| 2012/0257561 A1* | 10/2012 | Redding | H04L 12/1827 370/312 |
| 2015/0029844 A1* | 1/2015 | Pathmasuntharam | H04W 28/22 370/230 |

* cited by examiner

WIRELESS RECEIVING SYSTEM AND ASSOCIATED SIGNAL PROCESSING METHOD

This application claims the benefit of Taiwan application Serial No. 102111498, filed Mar. 29, 2013, the subject matter of which is incorporated herein by reference.

BACKGROUND OF THE INVENTION

Field of the Invention

The invention relates in general to a wireless communication system, and more particularly, to a packet detection technology.

Description of the Related Art

A wireless local area network (WLAN) system transceives data in a unit of packets. To lower possibilities of collisions between packets and to enhance transmission quality, two successive packets are transmitted with a constant time interval in between. For example, 802.11n specifications define a short interframe space (SIFS) interval in length of 16 μs, and a reduced interframe space (RIFS) interval in length of 2 μs.

FIG. 1 shows an example of a timing relationship between two 802.11n packets and corresponding operations at a receiving end according to the prior art. In the example, the packet P1 is completely delivered to the receiving end at the time point t10, and the receiving end finishes decoding the packet P1 at the time point t11 and starts searching for a next packet. A preamble at the beginning of each packet, e.g., a shaded area at the beginning of a packet P2, serves as reference for the receiving end to determine the presence of a packet. In general, the receiving end has no way of learning in advance whether an interval between the packets P1 and P2 is a SIFS or RIFS. In other words, the receiving end cannot predict an arriving time point of the packet P2. As such, the receiving end is required to continuously monitor whether a signal that represents the preamble of a packet arises in the communication channel. More specifically, a WLAN receiving end continuously receives wireless signals in a communication channel, performs signal processes including automatic gain control (AGC), analog-to-digital conversion, demodulation and decoding, and determines whether a current input signal is the preamble of a packet according to a decoding result.

Certain signal processes performed before decoding aim at adjusting an input signal to meet requirements of subsequent processes. For example, the amplitude of an input signal is changed through an AGC process so that the amplitude of the adjusted signal conforms to an input signal range of a subsequent analog-to-digital converter (ADC). Further, certain processes are for eliminating offsets caused by channel effects or circuit mismatch, e.g., carrier frequency offset (CFO) and sampling frequency offset (SFO), so as to prevent these offsets from leading to incorrect decoding results. In practice, operation parameters, e.g., a gain of an AGC circuit, or a compensation parameter for eliminating the CFO or SFO, involved in the two types of processes above, need to be dynamically adjusted in real-time.

In the prior art, a receiving end usually stores a set of original parameters, and resets its hardware/software/firmware according to the set of original parameters each time packet searching begins (e.g., at the time point t11). For example, the set of original parameters may include an initial gain for initializing an AGC circuit. The AGC circuit then dynamically adjusts a gain applied to an input signal according to the amplitude of the input signal, starting from the initial gain. In practice, after packet searching begins and before the preamble of a next packet arises (e.g., a period between the time points t11 and t12 in FIG. 1), the input signal inputted into the receiving end is noises in the communication channel, and the adjustable parameters may drastically fluctuate and even significantly deviated from the initial values. For example, an enormous difference may exist between the AGC gain $G_{t12}$ at the time point t12 and the AGC gain $G_{t11}$ at the time point t11.

In the example in FIG. 1, after AGC control, analog-to-digital conversion, demodulation and decoding processes, at the time point t13, the receiving end determines that the preamble of the second packet P2 satisfies searching conditions. It is understood that, as the difference between the AGC gain suitable for receiving the preamble of the second packet P2 and the gain $G_{t12}$ gets larger, the AGC circuit usually takes more time for adjusting its gain, and thus the time at which the time point t13 emerges becomes delayed. Similarly, large differences between the various adjustable parameters and corresponding converged values all lead to the delay in the time point t13. With a delayed emerging time of the time point t13, a part of the data carried in the second packet P2 may be lost, or the preamble of the second packet P2 may not be identified to even miss the entire second packet P2.

SUMMARY OF THE INVENTION

The invention is directed to a wireless receiving system and an associated signal processing method. In the present invention, as two packets successively arriving at a receiving end may have similar signal characteristics, the receiving end starts packet searching at a probable emerging time of a next packet according to parameters that are suitable for a previous packet, thereby reducing the time for adjusting various parameters in packet searching. The present invention further discloses a mechanism for determining whether an input signal corresponds to a preamble of an 802.11n packet.

According to an embodiment of the present invention, a wireless receiving system is provided. The wireless receiving system includes a packet searching module and a memory module. The packet searching module performs packet searching that includes adopting at least one parameter. The memory module stores the at least one parameter corresponding to a packet as a set of reference parameters. At a predetermined time point, the packet searching module again performs packet searching according to the set of reference parameters stored in the memory module.

According to another embodiment of the present invention, a signal processing method is provided. The method includes performing packet searching, including adopting at least one parameter until a packet is found, storing the at least one parameter corresponding to the packet as a set of reference parameters, and again performing packet searching at a predetermined time point according to the set of reference parameters.

The above and other aspects of the invention will become better understood with regard to the following detailed description of the preferred but non-limiting embodiment. The following description is made with reference to the accompanying drawings.

DETAILED DESCRIPTION OF THE INVENTION

Figure 2:
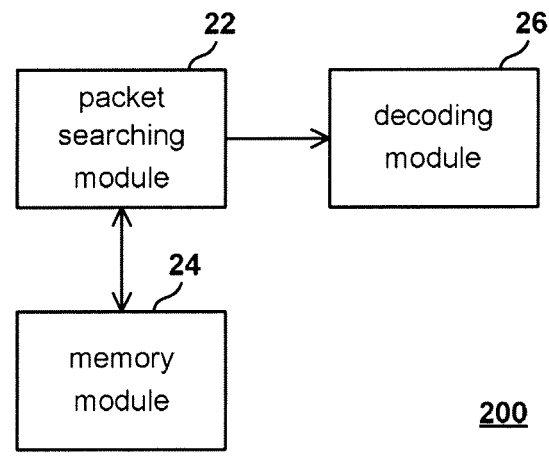
FIG. 2 is a block diagram of a wireless receiving system according to an embodiment of the present invention.

FIG. 2 shows a wireless receiving system according to an embodiment of the present invention. Referring to FIG. 2, a wireless receiving system 200 includes a packet searching module 22, a memory module 24, and a decoding module 26. It is understood by one person skilled in the art that the wireless receiving system 200 may further include other optional functional blocks that are not depicted in FIG. 2, e.g., an antenna or a local oscillator. To precisely present the spirit of the present invention, the description below focuses on operations of the packet searching module 22, the memory module 24 and the decoding module 26, and the wireless receiving system 200 is exemplified by an 802.11n compliant wireless communication system.

The packet searching module 22 performs packet searching to determine whether an 802.11n compliant packet exists in a communication channel. In practice, for example, packet searching includes performing automatic gain control (AGC), analog-to-digital conversion, demodulation and decoding processes on an input signal. During packet searching, the packet searching module 22 may selectively adjust one or multiple parameters according to the input signal. For example, an AGC gain, a carrier frequency offset (CFO) compensation value, and/or a sampling frequency offset (SFO) compensation value is adjusted, or non-ideal factors resulted from circuit mismatch due to channel effects are corrected. Thus, the input signal is adjusted to satisfy requirement of subsequent processes.

Figure 1:
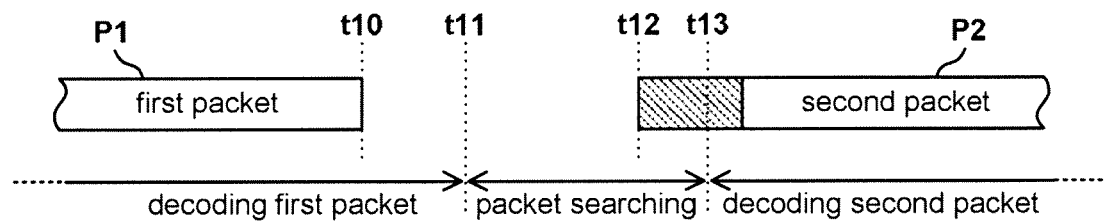
FIG. 1 shows an example of a timing relationship between two WLAN packets and corresponding operations at a receiving end.

The memory module 24 stores at least one parameter that the packet searching module 22 adopts when a packet is found in packet searching. The least one parameter serves as a set of reference parameters. Taking FIG. 1 for example, after completing packet searching for the packet P1, the packet searching module 22 stores parameters that are determined suitable for the packet P1 in packet searching to the memory module 24 to serve as reference parameters, including an AGC gain, a CFO compensation value and an SFO compensation value. In practice, for example, the memory module 24 may be a buffer or a memory in different forms, or may be a circuit component (e.g., a capacitor) capably of temporarily storing a potential level. In practice, the memory module 24 may also be integrated into the packet searching module 22.

As previously stated, based on 802.11n specifications, two types of packet intervals are defined—short interframe space (SIFS) having a length of 16 μs, and reduced interframe space (RIFS) having a length of 2 μs. Regardless of whether the interval between the packets P1 and P2 is the SIFS or the RISF, no signal that represents the preamble of a packet appears in the communication channel within 2 μs after the packet P1 ends. In the embodiment, after the packet P1 ends, the packet searching module 22 waits for 2 μs before starting packet searching to prevent unnecessary power consumption. At a time point that is 2 μs after an end time (the time point t10) of the packet P1, the packet searching module 22 again starts performing packet searching according to the set of reference parameters stored in the memory module 24.

Based on 802.11n specifications, two packets, which successively arrive at the wireless receiving system 200 and are spaced by the SIFS, may be possibly transmitted from different transmitting ends (e.g., two different wireless access points); however, two packets, which successively arrive at the wireless receiving system 200 and are spaced by the RIFS, are definitely transmitted from the same transmitting end. It is assumed that the packets P1 and P2 are spaced by an RIFS interval. It is expected that, after a period of approximately 2 μs subsequent to the end of the packet P1 arrives at the wireless receiving system 200 at the time point t10, the preamble of the packet P2 starts to arrive at the wireless receiving system 200. In other words, the time points t10 and t12 are spaced by 2 μs. As the packets P1 and P2 are transmitted by the same transmitting end, wireless signals in the packets P1 and P2 usually have similar characteristics, e.g., similar signal strengths, and similar channel effects resulted from similar transmission paths. Theoretically, the parameters, including the AGC gain, the CFO compensation value and the SFO compensation value, suitable for the packet P1 are likely to be suitable for the packet P2 as well. Thus, when the packets P1 and P2 are spaced by the RIFS interval, the packet searching module 22, by performing packet searching according to the reference parameters stored in the memory module 24, significantly reduces the time required for dynamically adjusting the parameters and thus increasing the speed for determining the presence of the packet P2.

It should be noted that, the set of reference parameters corresponding to the packet P1 may also serve as parameter starting values that the packet searching module 22 utilizes when starting to search for the second packet P2. In other words, instead of constantly adopting the set of reference parameters during the entire period of searching for the second packet P2, the packet searching module 22 may still dynamically adjust the parameters according to the current input signal. In practice, the packet searching module 22 may have identified the packet P2 without having to adjust the reference parameters corresponding to the packet P1 at all, or may need to slightly adjust the set of reference parameters. When the parameters suitable for the packets P1 and P2 are not identical, the packet searching module 22 may update the contents stored in the memory module 24 to the parameters suitable for the packet P2 after having identified the packet P2.

Figure 3:
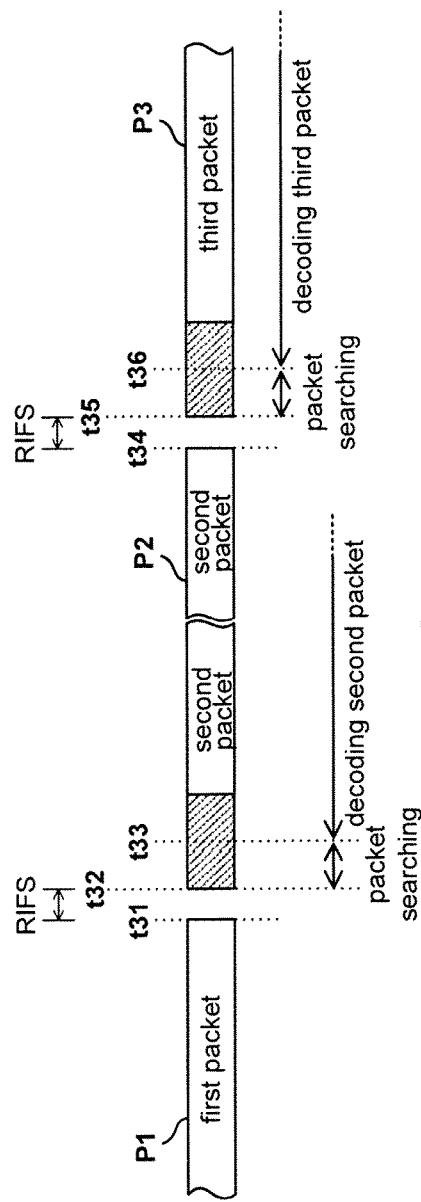
FIG. 3 shows a timing relationship of three 802.11n packets with RIFS intervals and corresponding operations at a receiving system according to an embodiment of the present invention.

FIG. 3 shows an example of a timing relationship of three 802.11n packets spaced by RIFS intervals and corresponding operations at a receiving system according to an embodiment of the present invention. As shown in FIG. 3, the first packet P1 is completely delivered to the wireless receiving system 200 at the time point t31. Between the time points t31 and t32, the packet searching module 22 has not yet started packet searching. At the time point t32 that is spaced by 2 μs from the time point t31, the packet searching module 22 starts packet searching according to the reference parameters previously stored in the memory module 24 (e.g., the parameters suitable for the first packet P1), and identifies the presence of the second packet P2 at the time point t33. Also at the time point t33, the decoding module 26 decodes the contents of the second packet P2. At the time point t34, the second packet P2 is completely delivered to the wireless receiving system 200. Similarly, at the time point t35 that is spaced by 2 µs from the time point t34, the packet searching module 22 starts packet searching according to the reference parameters previously stored in the memory module 24 (e.g., the parameters suitable for the second packet P2), and identifies the presence of the third packet P3 at the time point t36.

Please note that, the predetermined time point at which the packet searching module 22 starts performing packet searching for the second packet P2 is not limited to the time point t32 depicted in FIG. 3. For example, the packet searching module 22 may also start packet searching at a time point that is 2 µs after slightly earlier or later than the time point t31. In principle, the search start time is set to ensure that contents of the second packet P2 are not missed by the wireless receiving system 200.

Figure 4:
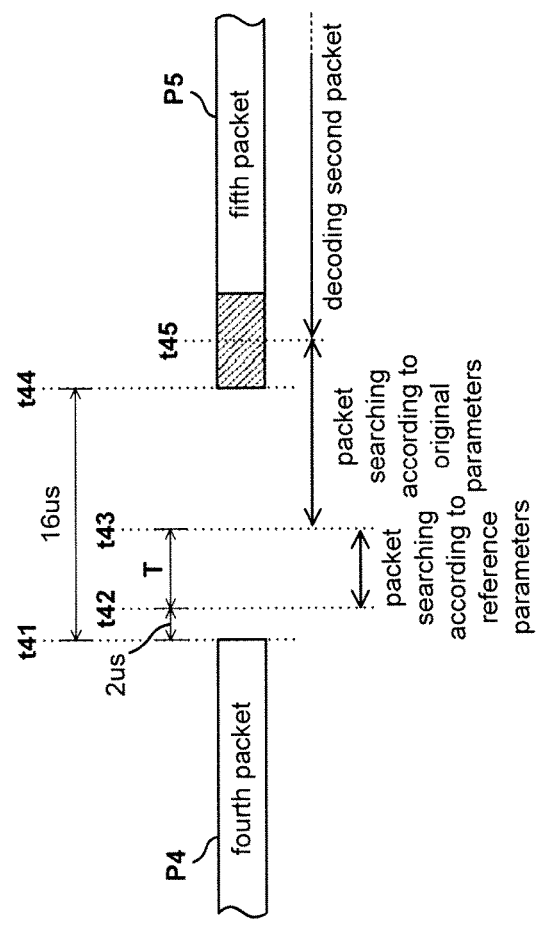
FIG. 4 shows a timing relationship between two 802.11n packets with a SIFS interval and corresponding operations at a receiving system according to an embodiment of the present invention.

When the interval between the first packet P1 and the second packet P2 in FIG. 3 is the SIFS instead of the RIFS, packet searching that begins at a time point 2 µs after the time point t31 cannot identify the preamble of a next packet within a short period. FIG. 4 shows a timing relationship between two 802.11n packets spaced by a SIFS interval, and corresponding operations at the wireless receiving system 200 according to an embodiment of the present invention. In one embodiment, the memory module 24 further stores another set of original parameters. As shown in FIG. 4, the fourth packet P4 is completely delivered to the wireless receiving system 200 at the time point t41. Similarly, between the time points t41 and t42 that are spaced by 2 µs from each other, the packet searching module 22 does not perform packet searching. The packet searching module 22 starts packet searching at a predetermined time point (the time point t42) according to the reference parameters (i.e., parameters suitable for the fourth packet P4) previously stored in the memory module 24. When the packet searching module 22 does not find a next packet after a predetermined period T, the packet searching module 22 changes to again performing packet searching according to the set of original parameters. The preamble of the fifth packet P5 is completely delivered to the wireless receiving system 200 at the time point t44, and the packet searching module 22 confirms the presence of the fifth packet P5 at the time point t45. In practice, the length of the period T may be set according to characteristics of the wireless receiving system 200 or the rule of thumb by a circuit designer.

As demonstrated by the above description, the searching mechanism adopted by the wireless receiving system of the present invention is distinct from the conventional approach that adopts the same set of original parameters each time packet searching begins. One spirit of the present invention is that, as two packets successively arriving at a receiving end may have similar signal characteristics, the receiving end applies parameters suitable for a previous packet to a time point at which a next packet probably appears and begins the searching procedure for the next packet, thereby reducing the time for adjusting the parameters in packet searching. It should be noted that, details for adaptively adjusting various parameters according to an input signal are known to one person having ordinary skill in the art, and shall be omitted herein.

Based on 802.11n specifications, the preamble of each packet is composed of ten predetermined sequences each being 0.8 µs in length, with contents of the predetermined sequences being identical. After determining the parameters including the AGC gain, the CFO compensation value and the SFO compensation value suitable for the current input signal, the packet searching module 22 determines whether a current signal is the preamble of a packet according to characteristics of the preamble of an 802.11n packet. Details of such are given below.

In one embodiment, the packet searching module 22 includes a sampling unit and a signal strength detector. The sampling unit samples the input signal to generate a sampling result. The signal strength detector calculates an accumulated strength of the sampling result within a time period, and determines whether the current input signal is the preamble of a packet according to whether the accumulated strength is higher than a strength threshold. For example, the sampling unit may sample every 0.8 µs, and the signal strength detector may calculate the accumulated value of the signal strength of 16 consecutive sampling points. The strength threshold may be designed to being improbably higher than the strength threshold when the input signal is mainly noises. Conversely, when contents representing the preamble of a packet start to appear in the input signal, the accumulated value becomes higher than the strength threshold.

In one embodiment, the packet searching module 22 includes a correlation unit and a determining unit. The correlation unit calculates at least one correlation level of a plurality of segments of an input signal. The determining unit determines whether the current input signal is the preamble of a packet according to whether a sum of the at least one correlation level is higher than a correlation threshold. For example, the plurality of segments may be ten continuous segments each being 0.8 µs in length in the input signal. The correlation unit may calculate the correlation level of the adjacent segments, and the determining unit may determine whether the current input signal is the preamble of a packet according to whether a sum of nine correlation levels generated by the correlation unit is higher than a correlation threshold.

In one embodiment, the packet searching module 22 includes a match filter and a determining unit. The match filter calculates a matching level between an input signal and a reference signal. For example, the match filter may capture ten continuous segments each being 0.8 µs in length from the input signal, and regard the reference signal as the foregoing known predetermined sequence. The determining unit determines whether the current input signal corresponds to the preamble of a packet according to whether the matching levels are higher than a matching threshold. If the ten continuous segments in the input signal correspond to the preamble of a packet, theoretically speaking, ten peak values higher than the matching threshold may appear in an output signal of the match filter.

In one embodiment, the packet searching module 22 similarly includes a matching filer and a determining unit. The match filter calculates a matching level between an input signal and a reference signal. Similarly, the match filter may capture ten continuous segments each being 0.8 µs in length from the input signal, as the reference signal being the foregoing known predetermined sequence. The determining unit then determines whether the input signal corresponds to the preamble of a packet according to whether a cycle of the matching level falls within a predetermined range. If the ten continuous segments in the input signal correspond to the preamble of a packet, theoretically speaking, ten peak values higher than the matching threshold may appear in an output signal of the match filter, with an average cycle of the 10 peak values being approximately 0.8 µs.

It should be noted that, the packet searching module 22 of the present invention may selectively adopt a plurality of determining mechanisms described in the foregoing embodiments, so as to determine an input signal as the preamble of an 802.11n packet when the input signal satisfies the corresponding determining principles.

Figure 5:
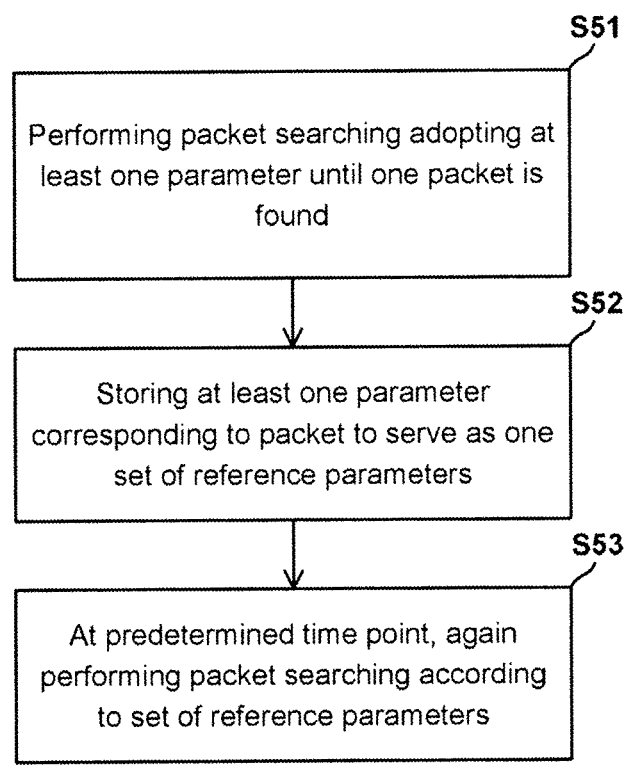
FIG. 5 is a flowchart of a signal processing method according to an embodiment of the present invention.

FIG. 5 shows a signal processing method applied to a wireless receiving system according to an embodiment of the present invention. Referring to FIG. 5, the signal processing method includes the following steps. In step S51, performing packet searching, including adopting at least one parameter, until a packet is found. In step S52, storing the at least one parameter corresponding to the packet to serve as a set of reference parameters. In step S53, at a predetermined time point, again performing packet searching according to the set of reference parameters. Various circuit operations and modifications in the description associated with the wireless receiving system 200 are applicable to the signal processing method in FIG. 5, and shall be omitted herein.

A wireless receiving system and an associated signal processing method are disclosed as in the embodiments. As two packets successively arriving at a receiving end may have similar signal characteristics, a receiving end of the present invention starts packet searching at a time point which a next packet probably appears according to parameters suitable for a previous packet, thereby shortening the time required for adjusting the parameters in packet searching. Further, different mechanisms for determining whether an input signal corresponds to the preamble of an 802.11n packet are also disclosed by the present invention.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless receiving system, comprising:
a packet searching module, configured to perform packet searching, including adopting at least one parameter of a packet that is derived before decoding the packet; and
a memory module, storing the at least one parameter corresponding to a packet to serve as a set of reference parameters;
wherein, at a predetermined time point after the packet is completely delivered to the wireless receiving system, the packet searching module starts to perform packet searching according to the set of reference parameters stored in the memory module,
wherein the memory module further stores a set of original parameters; when the packet searching module does not find a subsequent packet after a predetermined period from the predetermined time point, the packet searching module again performs packet searching according to the set of original parameters stored in the memory module.

2. The wireless receiving system according to claim 1, wherein the at least one parameter corresponds to at least one of a carrier frequency offset (CFO) compensation value, and a sampling frequency offset (SFO) compensation value.

3. The wireless receiving system according to claim 1, wherein the packet is compliant to 802.11n specifications, and the predetermined time point is 2 μs after the packet is completely delivered to the wireless receiving system.

4. The wireless receiving system according to claim 3, wherein the packet searching module comprises:
a sampling unit, configured to sample an input signal to generate a sampling result; and
a signal strength detector, configured to calculate an accumulated signal strength of the sampling result within a time period, and to determine whether the input signal corresponds to a packet preamble according to whether the accumulated strength is higher than a strength threshold.

5. The wireless receiving system according to claim 3, wherein the packet searching module comprises:
a correlation unit, configured to calculate at least one correlation level of a plurality of segments in an input signal; and
a determining unit, configured to determine whether the input signal corresponds to a packet preamble according to whether a sum of the at least one correlation level is higher than a correlation threshold.

6. The wireless receiving system according to claim 3, wherein the packet searching module comprises:
a match filter, configured to calculate a matching level between an input signal and a reference signal; and
a determining unit, configured to determine whether the input signal corresponds to a packet preamble according to whether the matching level is higher than a matching threshold.

7. The wireless receiving system according to claim 3, wherein the packet searching module comprises:
a match filter, configured to calculate a matching level between an input signal and a reference signal; and
a determining unit, configured to determine whether the input signal corresponds to a packet preamble according to whether a cycle of the matching level falls within a predetermined range.

8. The wireless receiving system according to claim 1, wherein the set of reference parameters is updated in the memory module based on receipt and processing of a subsequent packet.

9. A signal processing method, applied to a wireless receiving system, comprising:
a) performing packet searching, including adopting at least one parameter, until a packet is found, the at least parameter being derived before decoding the packet;
b) storing the at least one parameter corresponding to the packet to serve as a set of reference parameters;
c) at a predetermined time point after the packet is completely delivered to the wireless receiving system, start again performing packet searching according to the set of reference parameters; and
after step (c), when a subsequent packet is not found after a predetermined period from the predetermined time point, again performing packet searching according to a set of original parameters.

10. The signal processing method according to claim 9, wherein the at least one parameter corresponds to at least one of a CFO compensation value, and an SFO compensation value.

11. The signal processing method according to claim 9, wherein packet is compliant to 802.11n specifications, and the predetermined time point is 2 μs after the packet is completely delivered to the wireless receiving system.

12. The signal processing method according to claim 11, wherein performing packet searching comprises:
sampling an input signal to generate a sampling result; and
calculating an accumulated signal strength of the sampling result within a time period, and determining whether the input signal corresponds to a packet preamble according to whether the accumulated strength is higher than a strength threshold.

13. The signal processing method according to claim 11, wherein performing packet searching comprises:
   calculating at least one correlation level of a plurality of segments in an input signal; and
   determining whether the input signal corresponds to a packet preamble according to whether a sum of the at least one correlation level is higher than a correlation threshold.

14. The signal processing method according to claim 11, wherein performing packet searching comprises:
   calculating a matching level between an input signal and a reference signal; and
   determining whether the input signal corresponds to a packet preamble according to whether the matching level is higher than a matching threshold.

15. The signal processing method according to claim 11, wherein performing packet searching comprises:
   calculating a matching level between an input signal and a reference signal; and
   determining whether the input signal corresponds to a packet preamble according to whether a cycle of the matching level falls within a predetermined range.

16. The signal processing method according to claim 9, further comprising:
   updating the set of reference parameters in the memory module based on receipt and processing of a subsequent packet.

\* \* \* \* \*